F. G. FISCHER.
CANNON.
APPLICATION FILED JAN. 22, 1919.

1,320,041.

Patented Oct. 28, 1919.

Witnesses
Guy M. Spring
U. B. Hillyard.

Inventor
Fred G. Fischer
By Richard B. Owen
Attorney

UNITED STATES PATENT OFFICE.

FRED G. FISCHER, OF VERMILION, OHIO.

CANNON.

1,320,041.   Specification of Letters Patent.   Patented Oct. 28, 1919.

Application filed January 22, 1919. Serial No. 272,533.

*To all whom it may concern:*

Be it known that I, FRED G. FISCHER, a citizen of the United States, residing at Vermilion, in the county of Erie and State of Ohio, have invented certain new and useful Improvements in Cannon, of which the following is a specification.

This invention relates to field ordnance, such as cannon, and aims to provide a gun that can be self propelled, thereby obviating the use of horses for drawing the gun over roads and fields and lessening the work of the soldier and enabling the gun to be manipulated with greater ease and despatch.

The invention has for its object to equip field ordnance with a motor, preferably of the internal combustion variety, and to connect such motor with the usual wheels whereby the latter may be used as drivers for propelling the gun.

The invention also aims to provide the gun with steering mechanism so that it may be guided in any direction by the operator of the engine.

Other objects and advantages are contemplated and will appear as the nature of the invention is understood from the accompanying drawing and the sub-joined description.

The drawing illustrates a preferred embodiment of the invention, however, it is to be understood that in adapting the same to meet different conditions, various changes in the form, proportion, and minor details of construction may be resorted to without departing from the nature of the invention as claimed hereinafter.

In the drawing.

Corresponding and like parts are referred to in the following description and indicated in both views of the drawings by like reference characters.

Figure 1:
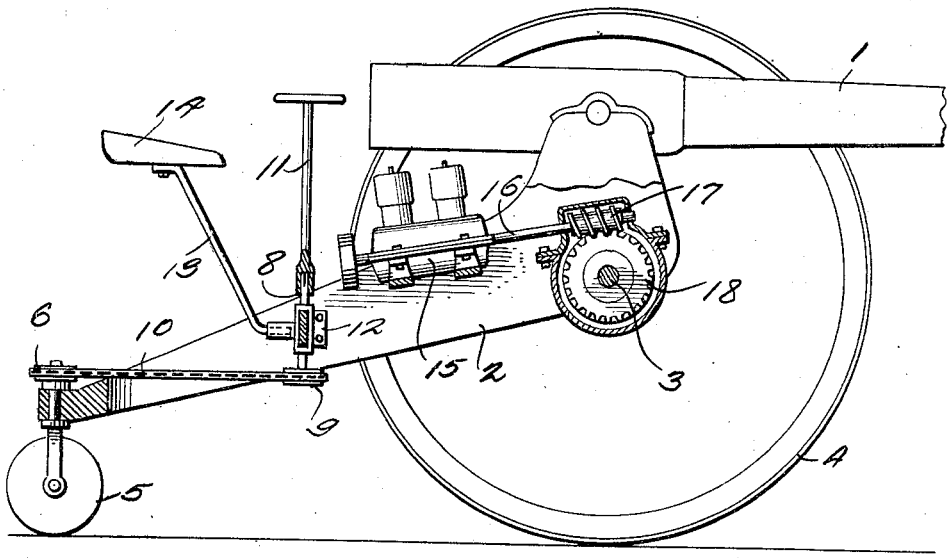
Figure 1 is a vertical longitudinal section of a field gun provided with propelling and steering mechanisms embodying the invention.
Figure 2:
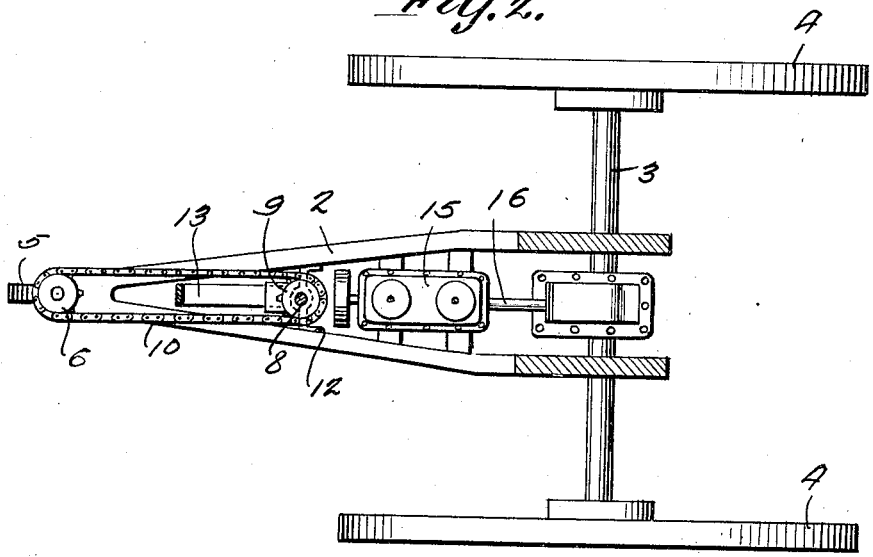
Fig. 2 is a plan view, the gun barrel being removed and the upper portion of the carriage being in section.

The gun illustrated is typical of the type of field ordnance mounted upon a carriage, the same comprising a barrel 1 and carriage 2, the latter being mounted upon an axle 3 to which is fitted wheels 4 in a manner to admit of such wheels being utilized as drivers for propelling the gun. A steering wheel 5 is fitted to the lower end of the trailer and is mounted in a frame the stem of which is journaled vertically to the trailer and is provided at its upper end with a sprocket wheel 6. A steering post 8 is mounted vertically on the carriage and is provided with a sprocket wheel 9 which is connected by means of a sprocket chain 10 with the sprocket wheel 6. An auxiliary steering post 11 is detachably fitted to the steering post 8 so as to be removed and not obstruct the free operation of the gun after the latter has been set in operative position. The auxiliary steering post 11 may be readily fitted to the main steering post 8 to admit of instant operation of the steering mechanism when it is desired to move the gun. A suitable bracket 12 is secured to the carriage 2 and constitutes a mount for the steering post 8 and the standard 13 of the seat 14. The standard 13 is likewise detachably fitted to the gun carriage so as to be removed and not obstruct the operation of the gun when the latter is adjusted for service.

A suitable engine 15 is conveniently mounted upon the gun carriage and may be of any type designed for utilizing liquid fuel. The engine 15 is preferably of the internal combustion type and is adapted to be supplied with fuel from a tank, not shown, mounted upon the carriage in any convenient position. The shaft 16 of the engine 15 is geared in any preferred way to the axle 3 so as to impart rotary movement thereto when it is required to propel the gun. As shown the shaft 16 has a worm 17 secured thereto which is in mesh with a worm wheel 18 coöperating with the axle 3 so as to impart rotary movement to the axle when the gun is in motion.

The invention is applicable to every type of field gun and contemplates utilizing any type of motor and any kind of steering mechanism, the purpose being to dispense with horse power as means for propelling the cannon and to supply the cannon with an independent motor, so that each gun may be independently propelled.

The foregoing description and the drawings have reference to what may be considered the preferred, or approved form of my invention. It is to be understood that I may make such changes in construction and arrangement and combination of parts, materials, dimensions, et cetera, as may prove expedient and fall within the scope of the appended claim.

Having thus fully described my invention, what I claim as new and desire to secure by Letters Patent is:—

In a mechanically propelled cannon, a steering wheel journaled vertically to the end of the carriage, a bracket secured to the carriage, a steering post mounted in the bracket, means connecting the steering post with the steering wheel, an auxiliary steering post detachably fitted to the main steering post, and a seat detachably fitted to the bracket.

In testimony whereof I affix my signature in presence of two witnesses.

FRED G. FISCHER.

Witnesses:
C. A. TRIMBEL,
AUDREY M. TROXEL.

Copies of this patent may be obtained for five cents each, by addressing the "Commissioner of Patents, Washington, D. C."